United States Patent
Lee et al.

(10) Patent No.: US 8,917,693 B2
(45) Date of Patent: *Dec. 23, 2014

(54) METHOD OF TRANSMITTING AND RECEIVING WIRELESS RESOURCE INFORMATION

(71) Applicant: LG Electronics Inc., Seoul (KR)

(72) Inventors: Young Dae Lee, Hanan-si (KR); Sung Duck Chun, Anyang-si (KR); Myung Cheul Jung, Seoul (KR); Seong Jun Park, Ansan-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,218

(22) Filed: Feb. 26, 2014

(65) Prior Publication Data

US 2014/0177568 A1     Jun. 26, 2014

Related U.S. Application Data

(63) Continuation of application No. 13/226,354, filed on Sep. 6, 2011, now Pat. No. 8,711,793, which is a continuation of application No. 12/092,262, filed as application No. PCT/KR2006/003419 on Aug. 30, 2006, now Pat. No. 8,665,802.

(30) Foreign Application Priority Data

Nov. 1, 2005  (KR) .................... 10-2005-0103919

(51) Int. Cl.
*H04W 76/02*  (2009.01)
*H04W 74/00*  (2009.01)
*H04W 74/08*  (2009.01)
*H04W 68/02*  (2009.01)
*H04W 68/00*  (2009.01)

(52) U.S. Cl.
CPC ............ *H04W 76/02* (2013.01); *H04W 74/006* (2013.01); *H04W 74/0833* (2013.01); *H04W 68/02* (2013.01); *H04W 68/00* (2013.01)
USPC ....................................... 370/329; 455/452.1

(58) Field of Classification Search
CPC .................................................. H04W 76/021
See application file for complete search history.

(56) References Cited

U.S. PATENT DOCUMENTS

6,778,835 B2   8/2004  You et al.
6,859,445 B1   2/2005  Moon et al.
(Continued)

FOREIGN PATENT DOCUMENTS

EP    1037491    9/2000
EP    1505847    2/2005
(Continued)

OTHER PUBLICATIONS

Sarvagya, M, et al.: Performance analysis of UMTS system for Web traffic over dedicated channels.
(Continued)

*Primary Examiner* — Jianye Wu
(74) *Attorney, Agent, or Firm* — Lee, Hong, Degerman, Kang & Waimey

(57) ABSTRACT

A method of transmitting and receiving radio resource information is disclosed, by which a mobile terminal is able to quickly access a mobile communication system. The present invention includes transmitting a paging message to locate a specific mobile terminal by including information for a radio resource allocated to the mobile terminal in the paging message receiving a response signal for the paging message transmitted according to the information for the radio resource, and performing a connection to the mobile terminal according to the response signal.

12 Claims, 7 Drawing Sheets

(56) References Cited

U.S. PATENT DOCUMENTS

| | | |
|---|---|---|
| 7,295,539 B2 | 11/2007 | Han et al. |
| 7,398,108 B2 | 7/2008 | Hondo |
| 7,643,454 B2 | 1/2010 | Guethaus et al. |
| 7,904,055 B2 | 3/2011 | Lee et al. |
| 2002/0089957 A1 | 7/2002 | Viero |
| 2004/0005887 A1 | 1/2004 | Bahrenburg et al. |
| 2004/0147274 A1 | 7/2004 | Khawand et al. |
| 2005/0014508 A1 | 1/2005 | Moulsley et al. |
| 2005/0232158 A1 | 10/2005 | Hondo |
| 2005/0286409 A1 | 12/2005 | Yoon et al. |
| 2007/0174885 A1 | 7/2007 | Hus et al. |
| 2008/0123585 A1 | 5/2008 | Granzow et al. |
| 2010/0014468 A1 | 1/2010 | Lee et al. |

FOREIGN PATENT DOCUMENTS

| | | |
|---|---|---|
| KR | 1020050057926 | 6/2005 |
| WO | 2004100598 | 11/2004 |
| WO | 2005/057822 | 6/2005 |

OTHER PUBLICATIONS

U.S. Appl. No. 12/092,262, Office Action dated Apr. 29, 2013, 9 pages.

METHOD OF TRANSMITTING AND RECEIVING WIRELESS RESOURCE INFORMATION

CROSS-REFERENCE TO RELATED APPLICATIONS

This application is a continuation of application of U.S. application Ser. No. 13/226,354, filed on Sep. 6, 2011, now U.S. Pat. No. 8,711,793, which is a continuation application of U.S. application Ser. No. 12/092,262, filed on Oct. 13, 2008, now U.S. Pat. No. 8,665,802, which was the National Stage of International Application No. PCT/KR2006/003419 filed on Aug. 30, 2006, which claims benefit of earlier filing date and right to priority to Korean Application No. 10-2005-0103919, filed on Nov. 1, 2005, the contents of which are all incorporated by reference herein their entirety.

TECHNICAL FIELD

The present invention relates to a method of controlling a radio resource in a wireless communication system providing wireless communications, and more particularly, to a method of transmitting and receiving radio resource information. Although the present invention is suitable for a wide scope of applications, it is particularly suitable for enhancing access and delay times taken to access a communication system.

BACKGROUND ART

FIG. 1 is a block diagram of a network structure of UMTS (universal mobile telecommunications system) to which a related art and the present invention are applicable.

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN), and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

FIG. 2 is an architectural diagram of a radio interface protocol between UE (user equipment) and UTRAN (UMTS terrestrial radio access network) based on the 3GPP radio access network standard.

Referring to FIG. 2, a radio interface protocol vertically includes a physical layer, a data link layer, and a network layer and horizontally includes a user plane for data information transfer and a control plane for signaling transfer.

The protocol layers in FIG. 2 can be divided into L1 (first layer), L2 (second layer), and L3 (third layer) based on three lower layers of the open system interconnection (OSI) standard model widely known in the communications systems.

The respective layers in FIG. 2 are explained as follows.

First of all, the physical layer (hereinafter named PHY) as the first layer offers an information transfer service to an upper layer using a physical channel. The physical layer PHY is connected to a medium access control (hereinafter abbreviated MAC) layer above the physical layer PHY via a transport channel. And, data are transferred between the medium access control layer MAC and the physical layer PHY via the transport channel. Moreover, data are transferred between different physical layers, and more particularly, between one physical layer of a transmitting side and the other physical layer of a receiving side via the physical channel.

The medium access control (hereinafter abbreviated MAC) layer of the second layer offers a service to a radio link control layer above the MAC layer via a logical channel.

The radio link control (hereinafter abbreviated RLC) layer of the second layer supports reliable data transfer and is operative in segmentation and concatenation of RLC service data units sent down from an upper layer. Hereinafter, the service data unit will be abbreviated SDU.

A radio resource control (hereinafter abbreviated 'RRC') layer located on a lowest part of the third layer is defined in the control plane only and is associated with configuration, reconfiguration and release of radio bearers to be in charge of controlling the logical, transport and physical channels (hereinafter, the radio bearer will be abbreviated RB). In this case, the RB means a service offered by the second layer for the data transfer between the UE and the UTRAN. And, the configuration of RB means a process of regulating characteristics of protocol layers and channels necessary for offering a specific service and a process of setting their specific parameters and operational methods, respectively.

RRC connection and signaling connection are explained in detail as follows.

First of all, a UE (user equipment) needs to make an RRC connection to a UTRAN to initiate communications and to make a signaling connection to a CN. The UE exchanges UE dedicated control information with the UTRAN or CN via the RRC and signaling connections. FIG. 3 is a flowchart of a process for transmitting messages exchanged between UE and RNC for an RRC connection and transmitting an IDT (initial direct transfer) message for a signaling connection.

Referring to FIG. 3, in a process for an RRC connection, a UE transmits an RRC connection request message to an RNC (S310), the RNC transmits an RRC connection setup message to the UE in response to the RRC connection request message (S320), and the UE transmits an RRC connection setup completion message to the RNC (S330). After successful completion of the above process, the RRC connection is established between the UE and the RNC. After the RRC connection has been established, the UE initiates a process for establishing a signaling connection by transmitting an IDT message (S340).

A random access channel (RACH) as one of transport channels of the asynchronous mobile communication system, WCDMA is explained as follows.

RACH is used in transmitting data having a short length in uplink. And, an RRC message such as an RRC connection request message, a cell update message, a URA update message and the like is transmitted via RACH. A logical channel CCCH (common control channel), DCCH (dedicated control channel) or DTCH (dedicated traffic channel) can be mapped to RACH that is one of transport channels. And, the transport channel RACH is mapped to a PRACH (physical random aces channel) that is one of physical channel.

FIG. 4 is a diagram for explaining a preamble and message transferred via a PRACH that is one of physical channels.

Referring to FIG. 4, the PRACH as one of uplink physical channels is divided into a preamble part and a message part.

The preamble part performs a power ramping function of adjusting a proper transmission power used for a message transmission and a function of preventing collisions between several user equipments.

And, the message part plays a role in transmitting MAC PDU (protocol data unit) to be delivered to a physical channel from a MAC layer.

If a UE's MAC layer instructs a UE's physical layer to make a PRACH transmission, the UE's physical layer firstly selects one access slot and one signature and then transmits a PRACH preamble to a base station (Node B) in uplink. The preamble is transmitted during an access slot interval of 1.33 ms. One signature is selected from sixteen kinds of signatures and is then transmitted for a first predetermined duration of the access slot.

If the UE transmits the preamble, the base station transmits a response signal via a AICH (acquisition indicator channel) that is one of downlink physical channels. The AICH transmitted in response to the preamble carries the signature selected by the preamble for a second predetermined duration of an access slot corresponding to the former access slot having carried the preamble. In this case, the base station transmits an affirmative response (ACK) or a negative response (NACK) to the UE via the signature carried by the AICH.

If the UE receives the ACK, the UE transmits a message part having a length of 10 ms or 20 ms using an OVSF code corresponding to the transmitted signature.

If the UE receives the NACK, the UE's MAC layer instructs the UE's physical layer to make the PRACH transmission again after a proper duration.

Meanwhile, if the UE fails in receiving AICH corresponding to the transmitted preamble, the UE transmits a new preamble after the selected access slot with a power one step higher than that of the former preamble.

FIG. 5 is a structural diagram of the AICH that is one of downlink physical channels.

Referring to FIG. 5, the AICH transmits a 16-symbol signature $S_i$ (i=0 . . . 15) for an access lot having a 5120-chip length. In this case, a UE selects an arbitrary signature $S_i$ from signatures $S_0$ to $S_{15}$ and then transmits the signature for a first 4096-chip length while setting the rest 1024-chip length to a transmission power 'OFF' interval of transmitting no symbol.

Meanwhile, a preamble part of the PRACH transmits 16-symbol signature $S_i$ (i=0 . . . 15) for a first 4096-chip length in a way similar to that shown in FIG. 4.

FIG. 6 is a block diagram of a network structure of E-UMTS (evolved universal mobile telecommunications system) to which a related art and the present invention are applicable.

Referring to FIG. 6, an E-UMTS is the system evolving from the conventional UMTS and its basic standardization is currently handled by the 3GPP.

First of all, E-UMTS network includes a user equipment (hereinafter abbreviated UE), a base station (hereinafter named Node B), a control plane server (hereinafter abbreviated CPS) performing a radio control function, a radio resource management (hereinafter abbreviated RRM) performing a radio resource management function, a mobility management entity (hereinafter abbreviated MME) performing a UE's mobility management function and an access gateway (hereinafter abbreviated AG) connected to an external network by being located at an end of the E-UMTS network. And, at least one cell exists in one Node B.

Layers of a radio interface protocol between UE and network can be classified into a first layer L1, a second layer L2 and a third layer L3 based on three lower layers of OSI (open system interconnection) reference model widely known in communication systems.

A physical layer belonging to the first layer offers an information transfer service using a physical channel. And, a radio resource control (hereinafter abbreviated RRC) located at the third layer plays a role in controlling radio resources between UE and network. For this, RRC layers enable RRC messages to be exchanged between the UE and the network. And, the RRC layers can be located at Node B, CPS/RRM and MME by having its function distributed.

FIG. 7 is an architectural diagram of a control plane of a radio interface protocol between UE (user equipment) and UTRAN (UMTS terrestrial radio access network) based on the 3GPP radio access network standard.

Referring to FIG. 7, a radio interface protocol vertically includes a physical layer, a data link layer, and a network layer and horizontally includes a user plane for data information transfer and a control plane for signaling transfer.

The protocol layers in FIG. 7 can be divided into L1 (first layer), L2 (second layer), and L3 (third layer) based on three lower layers of the open system interconnection (OSI) standard model widely known in the communications systems.

The respective layers of a radio protocol control plane shown in FIG. 7 and a radio protocol user plane shown in FIG. 8 are explained as follows.

First of all, the physical layer as the first layer offers an information transfer service to an upper layer using a physical channel. The physical layer PHY is connected to a medium access control (hereinafter abbreviated MAC) layer above the physical layer via a transport channel. And, data are transferred between the medium access control layer and the physical layer via the transport channel. Moreover, data are transferred between different physical layers, and more particularly, between one physical layer of a transmitting side and the other physical layer of a receiving side via the physical channel.

The medium access control (hereinafter abbreviated MAC) layer of the second layer offers a service to a radio link control layer above the MAC layer via a logical channel.

The radio link control (hereinafter abbreviated RLC) layer of the second layer supports reliable data transfer. A function of the RLC layer can be implemented in a function block included in the MAC layer. In this case, the RLC layer does not exist independently.

A PDCP layer of the second layer performs a header compression function for reducing unnecessary control information to efficiently transmit data, which is transmitted using such an IP packet as IPv4 or IPv6, in a radio section having a relatively small bandwidth.

A radio resource control (hereinafter abbreviated 'RRC') layer located on a lowest part of the third layer is defined in the control plane only and is associated with configuration, reconfiguration and release of radio bearers (hereinafter abbreviated RBs) to be in charge of controlling the logical, transport and physical channels. In this case, the RB means a service offered by the second layer for the data transfer between the UE and the UTRAN.

As a downlink transport channel carrying data to UE from network, there is BCH (broadcast channel) carrying system information and DL_SCH (downlink shared channel) carrying user traffic or control message.

As an uplink transport channel carrying data to network from UE, there is RACH (random access channel) carrying an initial control message and UL_SCH (uplink shared channel) carrying user traffic or control message.

However, in the related art access process, a step of confirming a location of UE and a step of allocating a necessary resource to the UE and the like are sequentially carried out to increase a time taken for an initial access setup process.

Disclosure of the Invention

Accordingly, the present invention is directed to a method of transmitting and receiving radio resource information that substantially obviates one or more problems due to limitations and disadvantages of the related art.

An object of the present invention is to provide a method of transmitting and receiving radio resource information, by which a mobile terminal is able to quickly access a mobile communication system.

Another object of the present invention is to provide a method of transmitting and receiving radio resource information, by which a mobile terminal is able to quickly access a mobile communication system by providing information for a radio resource allocated to the mobile terminal in advance through a paging or RACH procedure in case that the mobile terminal attempts a connection to a mobile communication system.

Another object of the present invention is to provide a method of transmitting and receiving radio resource information, by which a mobile terminal is able to quickly initiate a traffic transmission by minimizing wasted radio resources and enhancing an access speed in a manner of reducing paging information to transmit in case that the mobile terminal attempts a connection to a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting and receiving radio resource information according to the present invention includes the steps of transmitting a paging message to locate a specific mobile terminal by including information for a radio resource allocated to the mobile terminal in the paging message, receiving a response signal for the paging message transmitted according to the information for the radio resource, and performing a connection to the mobile terminal according to the response signal.

In another aspect of the present invention, a method of transmitting and receiving radio resource information includes the steps of receiving a paging message including first radio resource information; and transmitting a connection request message using the first radio resources information, the connection request message requesting a connection between a mobile station and a network.

In another aspect of the present invention, a method of transmitting and receiving radio resource information includes the steps of transmitting a paging message including first radio resource information; and receiving a connection request message requesting a connection between a mobile station and a network, wherein the connection request message is transmitted by the mobile station using the first radio resources information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
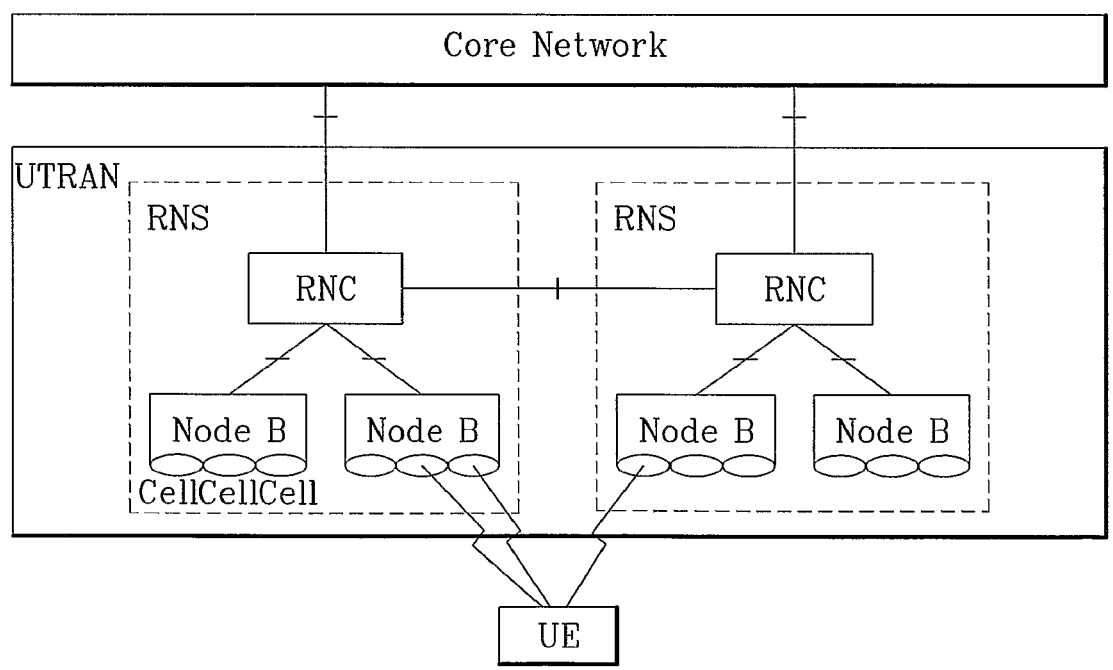
FIG. 1 is a block diagram of a network structure of UMTS (universal mobile telecommunications system)
Figure 2:
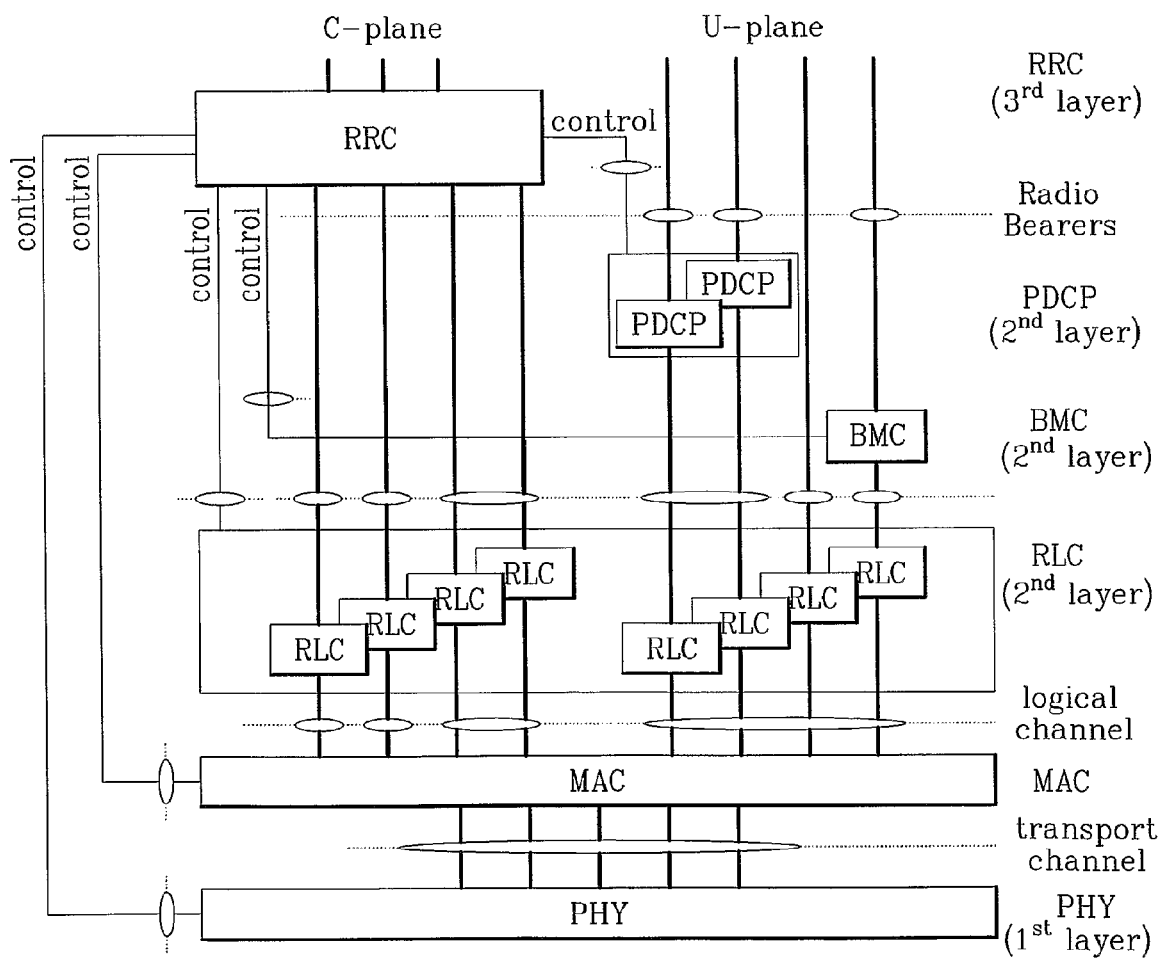
FIG. 2 is an architectural diagram of a radio interface protocol between UE (user equipment) and UTRAN (UMTS terrestrial radio access network) based on the 3GPP radio access network standard.
Figure 3:
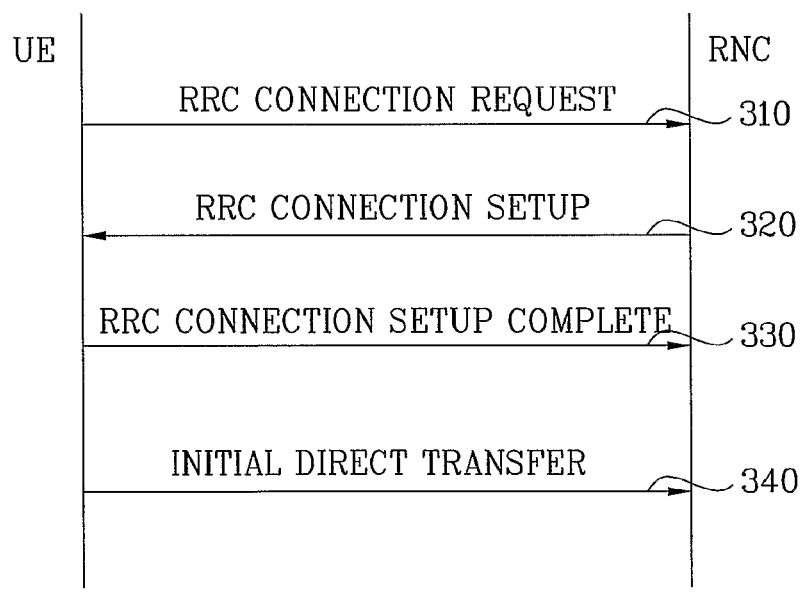
FIG. 3 is a flowchart of a process for transmitting messages exchanged between UE and RNC for RRC connection and transmitting an IDT (initial direct transfer) message for signaling connection.
Figure 4:
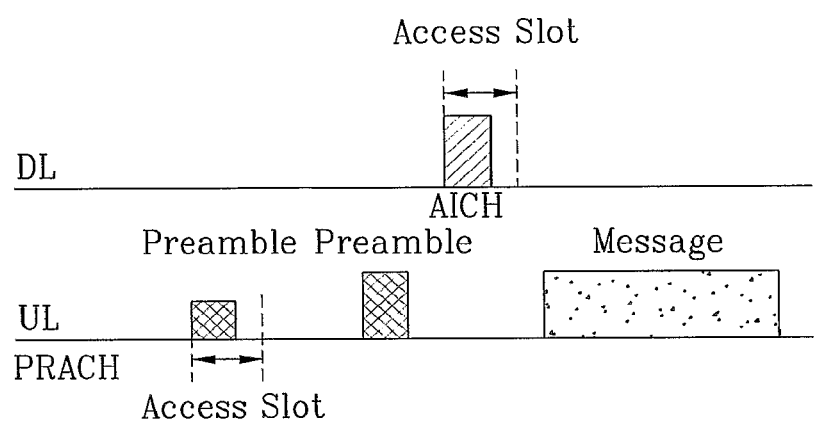
FIG. 4 is a diagram for explaining a preamble and message transferred via a physical channel PRACH.
Figure 5:
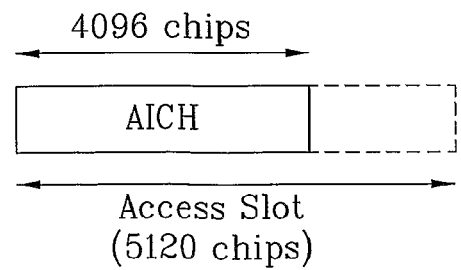
FIG. 5 is a structural diagram of a downlink physical channel AICH.

Reference will now be made in detail to the preferred embodiments of the present invention, examples of which are illustrated in the accompanying drawings. Wherever possible, the same reference numbers will be used throughout the drawings to refer to the same or like parts.

For convenience of explanation, it is assumed that a base station (Node B) is responsible for a paging procedure in a mobile communication system. It is a matter of course that such a base station upper node as MME, CPS and the like is able to take charge of the paging procedure. So, the present invention is not limited to the Node B.

In general, a mobile terminal in a current UTRAN can be classified with the following three states. In this case, the three states are active state, idle state and detached state.

In the active state, traffic is being transmitted from a current communication system to a mobile terminal or from a mobile terminal to a mobile communication system. In doing so, the mobile communication system manages a location of the mobile terminal by a cell unit.

In the idle state, a mobile terminal sustains a power saving mode for the purpose of power saving and the like. In this case, no traffic may be being transmitted to the mobile terminal And, a mobile communication system manages a location of the mobile terminal by recognizing the mobile terminal by TA (tracking area) unit. The TA is a unit of mobility management for a mobile terminal in an idle state.

In the detached state, no access can be made if a mobile terminal is in a power-off state or if a mobile communication system is unable to provide a random service to a mobile terminal. So, the mobile communication system does not manage a location of the mobile terminal and also does not maintain information for the mobile terminal.

In case that there exists traffic to be transmitted from a mobile communication system to a mobile terminal in an idle state, the mobile communication system initiates a paging procedure to find a location of the mobile terminal.

As mentioned in the foregoing description, the paging procedure can be executed by a base station (Node B or evolved Node B), which is just exemplary. So, the present invention is able to employ other network entities as subjects that execute the paging procedure.

The base station is able to obtain information for a TA (tracking area), at which the mobile terminal to receive the corresponding traffic is decided to be located, from a database located within the base station or a specific server that manages the TA.

According to the information, the base station notifies that there exists the traffic to be transmitted to the corresponding mobile terminal from the mobile communication system via a paging message using cells corresponding to the TA.

In the E-UTRAN (evolved UTRAN), a paging message can be transmitted via various transport channels. For instance, it is able to transmit the paging message via DL_SCH (downlink shared channel) or PCH (paging channel) for paging only.

The mobile communication system is characterized in that resource allocation information for a mobile terminal is included in a paging message to transmit both of the paging message and the resource allocation message simultaneously.

Alternatively, the mobile communication system assigns an identifier to be used by the mobile terminal and then transmits the identifier.

In performing the resource allocation information paging procedure, allocation information for various radio resources used by a mobile terminal is included. For instance, information for radio resources, information for UL_SCH (uplink shared channel) to be used by a mobile terminal or information for UL_SCH grant for granting a mobile terminal to use UL_SCH can be included.

In performing the paging procedure, the base station is able to recognize that a corresponding mobile terminal will attempt a connection procedure through a random access procedure of mobile station. For this, the base station is able to configure a radio resource for the access of the mobile terminal in advance.

The mobile terminal having received the paging message performs a connection procedure to the mobile communication system to enter an active state in case of confirming that the received paging message is a message for itself (mobile terminal). In this case, since the radio resource for the mobile terminal has been allocated to the base station, the mobile terminal is able to make a connection request to the base station via the granted UL_SCH (uplink shared channel) in direct without executing the random access procedure.

Figure 9:
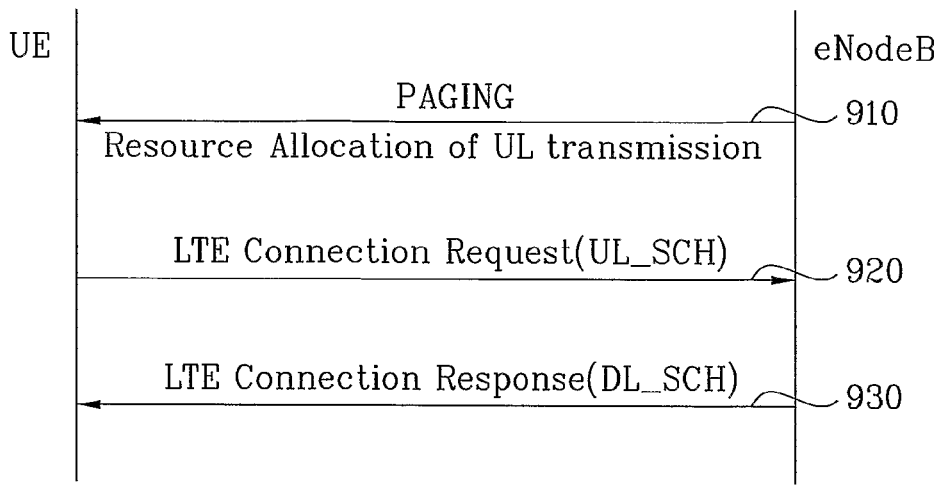
FIG. 9 is a flowchart of an initial call setup procedure according to according to one embodiment of the present invention.

FIG. 9 is a flowchart of an initial call setup procedure according to according to one embodiment of the present invention.

Referring to FIG. 9, a paging procedure is explained as follows.

First of all, in case that traffic to be transmitted to a corresponding mobile user equipment (UE) is generated, a base station performs a paging procedure. In FIG. 9, an evolved Node B is employed as the base station to perform a paging execution, which is just exemplary.

The base station transmits a paging message to a TA at which the corresponding UE is estimated to be located (S910). In doing so, the base station allocates radio resources usable by the UE in advance. In other words, the base station allocates a radio resource for UL_SCH (uplink shared channel) to be used by the corresponding UE and then transmits a paging message which comprises information (UL_SCH Grant information) indicating that the paging message includes the radio resource allocation. In this case, the paging message is able to carry such UL_SCH associated information usable by the UE as a corresponding frequency, timing, information for time and the like.

The corresponding UE having received the paging message recognizes that the paging message is sent for itself and then confirms information for UL_SCH.

Figure 6:
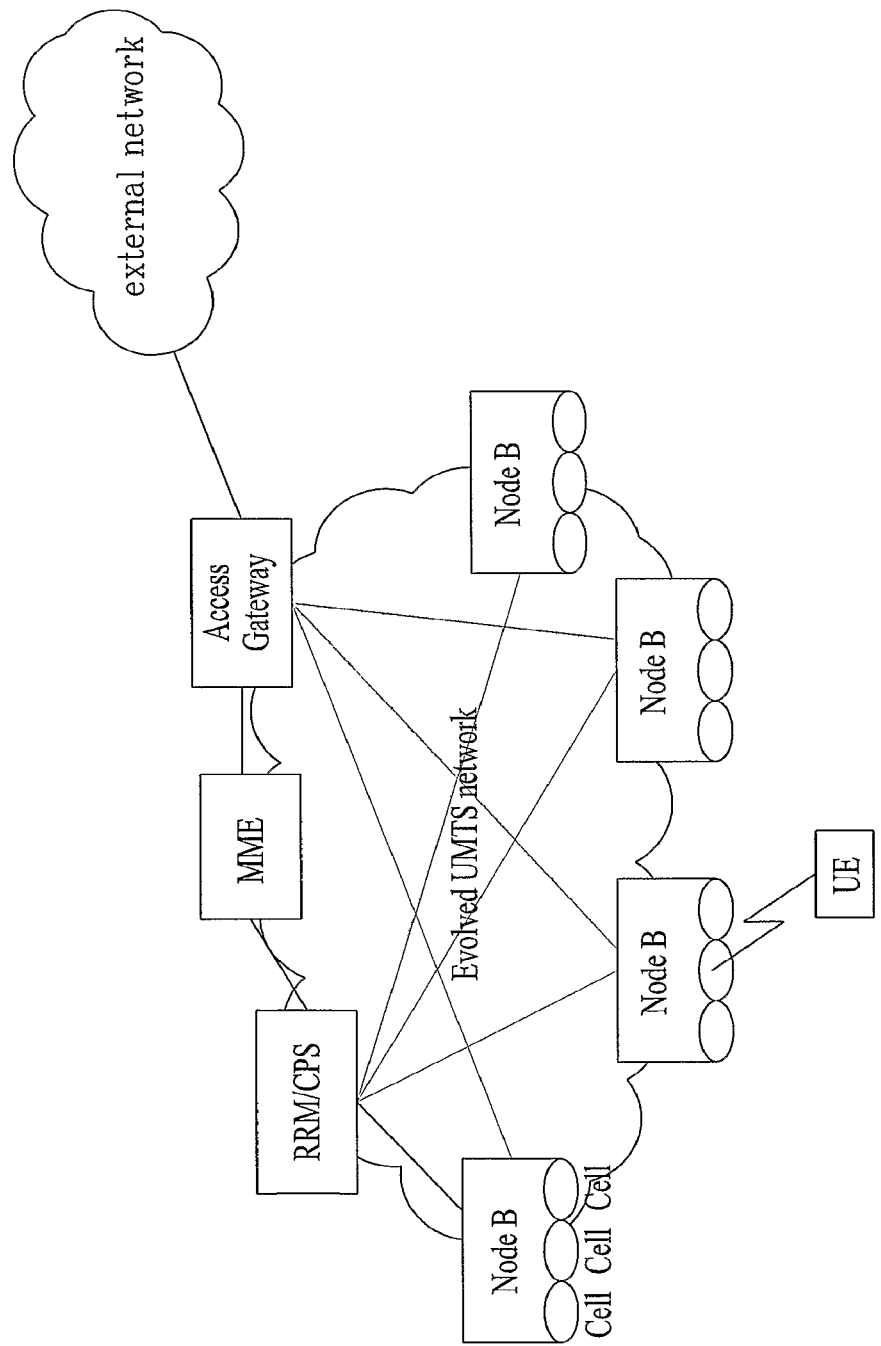
FIG. 6 is a block diagram of a network structure of E-UMTS (evolved universal mobile telecommunications system) to which a related art and the present invention are applicable.
Figure 7:
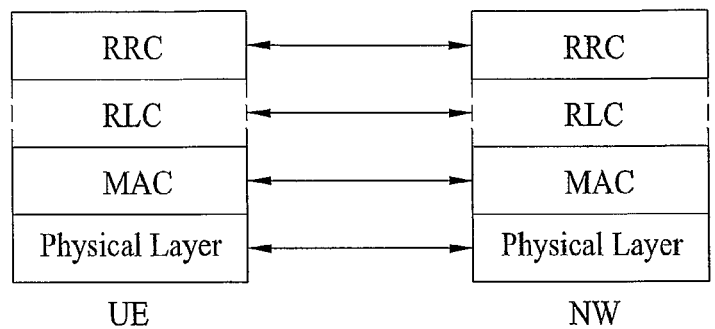
FIG. 7 is an architectural diagram of a control plane of a radio interface protocol between UE (user equipment) and UTRAN (UMTS terrestrial radio access network) based on the 3GPP radio access network standard.
Figure 8:
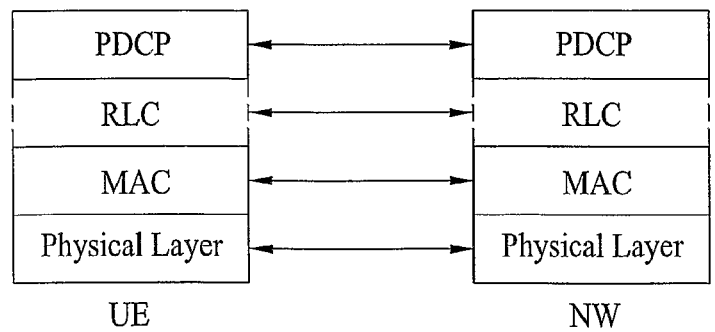
FIG. 8 is an architectural diagram of a user plane of a radio interface protocol between UE (user equipment) and UTRAN (UMTS terrestrial radio access network) based on the 3GPP radio access network standard.

The UE then transmits a LTE connection request message for requesting a connection to a LTE (long term evolution) mobile communication system to the base station via the corresponding UL_SCH (uplink shared channel) information (S920). In this case, the LTE means a network of the E-UMTS explained in FIG. 6 and the like.

Having received the LTE connection request message, the base station performs a procedure for a connection between the mobile station and the mobile communication system. The base station then transmits the corresponding information for the connection procedure to the UE to inform that the mobile communication system connection is completed.

Meanwhile, the paging message is transmitted to several cells corresponding to the TA and the several cells may be located across several base stations. So, the paging message can be transmitted to the several base stations. Since a UE is located at a specific cell managed by a specific base station, it may be unnecessary to transmit the paging message to other base stations included in the cells except the corresponding cell where the UE is located. In this case, if information for radio resource allocation is additionally added, it is probable that radio resources are wasted. Considering this, a method for enhancing an access speed with minimal radio resource waste in a manner of adding information only for RACH preamble to a paging message can be taken into consideration.

Figure 10:
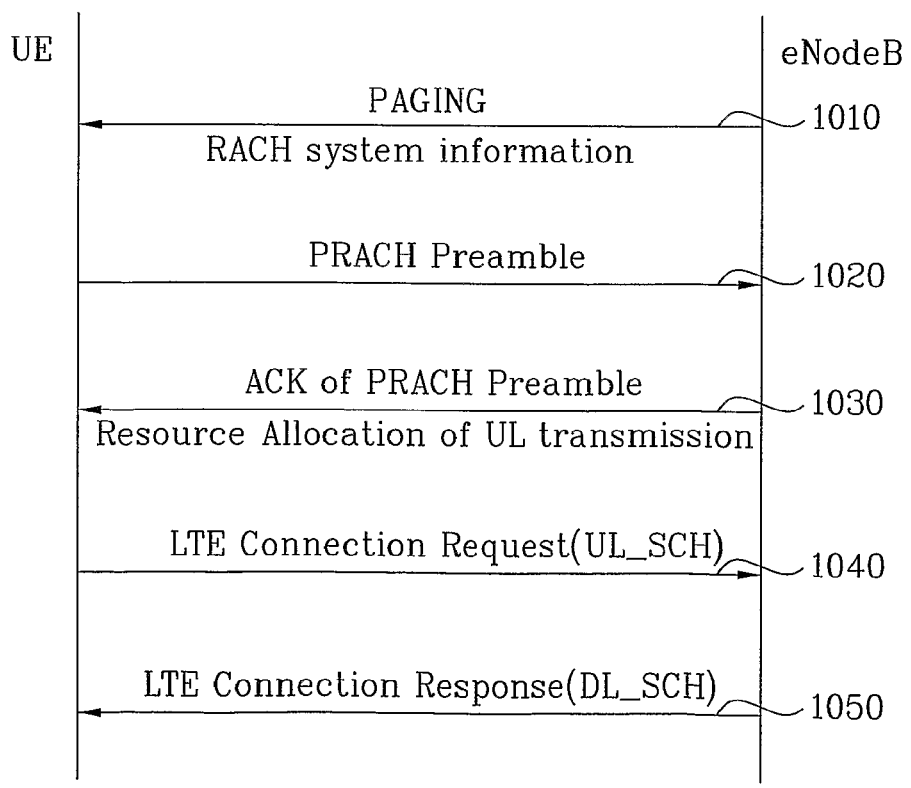
FIG. 10 is a flowchart of an initial call setup procedure according to another embodiment of the present invention

FIG. 10 is a flowchart of an initial call setup procedure according to another embodiment of the present invention.

Referring to FIG. 10, a paging procedure S1010 is explained as follows.

First of all, different from the previous embodiment explained with reference to FIG. 9, the present embodiment is characterized in that a mobile communication system assigns an identifier that a corresponding UE can use for PRACH preamble in the course of a RACH procedure.

And, a paging message according to the present embodiment includes an identifier that the corresponding UE can use for the PRACH preamble in the RACH procedure.

Moreover, the paging message is able to include various kinds of information for identifying the UE. Preferably, the paging message includes information for a signature set up by a mobile communication system to be used by the UE.

The signature included in the paging message corresponds to an ID of a UE attempting a paging. So, the signature can be mapped to the ID of the UE attempting the paging.

Besides, the base station is able to reserve a portion of the whole signature for UEs which attempt the paging.

Meanwhile, the corresponding UE having received the paging message confirms that the received paging message is for the UE itself and then transmits PRACH preamble to the base station (S1020). In doing so, the UE confirms identifier information transmitted via the paging message, and more preferably, a signature.

After completion of the confirming procedure, the UE transmits the signature to the base station using the confirmed signature as a signature of the PRACH preamble. The PRACH preamble can be operated in contention-based.

Having received the PRACH preamble, the base station is able to confirm that the UE attempting the connection via the paging procedure S1020 is the corresponding UE having attempted the call initiation via the paging procedure S1010, by means of the corresponding signature mapped to the ID of the UE.

In particular, the base station is able to confirm the ID of the corresponding UE using the signature of the PRACH preamble transmitted by the corresponding UE.

Having allocated a radio resource that can be used by the UE for a connection to the mobile communication system, the base station transmits ACK (acknowledgement) for the PRACH preamble to the UE. In this case, the ACK message can be transmitted on such a channel as AICH and DL_SCH (downlink shared channel). And, it is able to use the ACK message as UL_SCH grant information for granting the UE to use UL_SCH. Moreover, the ACK message is able to carry UL_SCH (uplink shared channel) associated information, which can be used by the UE, such as a corresponding frequency, timing, information for time and the like.

Alternatively, an identifier, which is set by a mobile communication system to be used by a UE, can be included in ACK information to be transmitted. Preferably, the identifier includes a signature to be used for PRACH preamble or an ID provided by a mobile communication system to discriminate a UE.

Having received the ACK message, the corresponding UE confirms information for UL_SCH from the ACK message (S1040).

Through UL_SCH information, the UE transmits a LTE connection request message, which makes a request to a LTE mobile communication system, to the base station.

Having received the LTE connection request message, the base station informs the UE of the completion of the mobile communication system connection in a manner of performing a system connection procedure and transmitting information for the system connection procedure to the UE (S1050).

In the above description, the identifier, which is set by the mobile communication system to be used by the UE, can be transmitted by being included in the paging information (transmitted according to the paging procedure S1010) or the ACK information (transmitted according to the procedure S1030). Preferably, the identifier includes a signature to be used for PRACH preamble or ID for discriminating a UE that can be provided by a mobile communication system.

Having confirmed the identifier from the Paging information or the ACK information attempts a connection to the mobile communication system using the corresponding identifier. And, the mobile communication system is able to allocate radio resources by recognizing a UE that uses the identifier.

Hence, the method shown in FIG. 10 according to the embodiment of the present invention reduces the paging information, thereby enhancing an access speed to the mobile communication system.

Accordingly, the present invention provides the following effect or advantage.

First of all, in case of attempting to achieve a connection with a specific UE, a mobile communication system allocates a resource for an uplink shared channel for the UE in advance and then informs the UE of the corresponding information in a paging procedure or a signature previously selected for the UE, thereby reducing a delay time taken for a mobile communication system connection considerably.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is suitable for a wide scope of applications, it is particularly suitable for enhancing access and delay times taken to access a communication system.

What is claimed:

1. A method for communicating messages at a user equipment (UE) in a Long Term Evolution (LTE) mobile communication system, the method comprising:
    receiving a paging message including information for identifying the UE from a base station;
    transmitting a physical random access channel (PRACH) preamble to the base station after receiving the paging message;
    receiving a PRACH preamble response message from the base station through a downlink shared channel (DL_SCH);
    transmitting a connection request message for requesting a connection to the base station through an uplink shared channel (UL_SCH); and
    receiving a connection response message in response to the connection request message through the DL_SCH from the base station,
    wherein the PRACH preamble response message includes an identifier identifying the UE,
    wherein the identifier included in the PRACH preamble response message is used by the UE to transmit the connection request message to the base station, and
    wherein the information for identifying the UE included in the paging message is different from the identifier included in the PRACH preamble response message.

2. The method of claim 1, wherein the PRACH preamble is used in contention-based.

3. The method of claim 2, wherein the connection response message indicates a completion of the connection.

4. The method of claim 1, wherein the PRACH preamble response message includes uplink shared channel associated information.

5. The method of claim 4, wherein the uplink shared channel associated information includes at least one of frequency information and time information.

6. The method of claim 1, wherein the PRACH preamble response message is used for granting the UE to use the UL_SCH.

7. A user equipment (UE) for communicating messages with a base station in a Long Term Evolution (LTE) mobile communication system, the UE comprising:
    means adapted to receive a paging message including information for identifying the UE from the base station;
    means adapted to transmit a physical random access channel (PRACH) preamble to the base station;
    means adapted to receive a PRACH preamble response message from the base station through a downlink shared channel (DL_SCH);
    means adapted to transmit a connection request message for requesting a connection to the base station through an uplink shared channel (UL_SCH); and means adapted to receive a connection response message in response to the connection request message through the DL_SCH from the base station, wherein the PRACH preamble response message includes an identifier identifying the UE, wherein the UE is adapted to use the identifier included in the PRACH preamble response message to transmit the connection request message to the base station, and wherein the information for identifying the UE included in the paging message is different from the identifier included in the PRACH preamble response message.

8. The UE of claim 7, wherein the PRACH preamble is used in contention-based.

9. The UE of claim 8, wherein the connection response message indicates a completion of the connection.

10. The UE of claim 7, wherein the PRACH preamble response message includes uplink shared channel associated information.

11. The UE of claim 10, wherein the uplink shared channel associated information includes at least one of frequency information and time information.

12. The UE of claim 7, wherein the PRACH preamble response message is used for granting the UE to use the UL_SCH.

* * * * *